United States Patent Office 3,539,363
Patented Nov. 10, 1970

3,539,363
PREPARATION OF ACIDIFIED MILK PRODUCTS
Dee Rich Morgan, Moraga, Calif., and Delmar Lloyd Andersen, Syracuse, and Donald E. Mook, Scarsdale, N.Y., assignors to Borden, Inc., New York, N.Y., a corporation of New Jersey
No Drawing. Filed May 12, 1966, Ser. No. 549,447
Int. Cl. A23c *3/00, 9/12*
U.S. Cl. 99—212                                    4 Claims

ABSTRACT OF THE DISCLOSURE

This invention relates to the method of preparing commercially sterile acidified milk products comprising the steps of fermenting a milk material until the desired degree of acidity is attained, and thoroughly admixing with said acidified material an edible stabilizing gum selected from the group consisting of vegetable gums, seaweed extracts, synthetic gums and mixtures thereof, in amount sufficient to prevent substantial decrease in the viscosity of said acidified material due to sterilization thereof by heat, and sterilizing te resultant mixture; and to the resultant product.

---

The normal present procedure for manufacturing acidified milk products is to pasteurize the base milk material before a suitable bacterial culture is added to produce the desired acid and flavor. Toward the end of the fermentation period, the product is packaged with a minimum of agitation and final fermentation usually takes place in the container. Thereafter, the product must be kept under refrigerated conditions until consumed. However, even when properly refrigerated, such products have a limited shelf life due to microbial action which causes flavor deterioration and breakdown in viscosity.

Attempts to heat sterilize acidified products to avoid this microbial action have been unsuccessful, since the use of heat at temperatures to effect sterilization results in a breakdown in viscosity or "thinning out" of the body of the products and often causes separation or "wheying off" in the product even if refrigerated. Either condition renders the products commercially unusable and has mitigated against the use of heat sterilization.

It has now been found possible to heat acidified milk products to prepare commercially sterile acidified milk products that can be kept without refrigeration for an indefinite period.

Briefly stated, the present invention comprises commercially sterile acidified milk products containing an edible stabilizing gum and to the methods of making such products as hereinafter more fully described.

As used herein, the term "commercially sterile" means processing of the products by heat in such a manner that the products will not spoil under ordinary market conditions, even though the products are not completely sterile.

The acidified milk products of the present invention include all cultured or acidified products such as sour cream, flavored sour cream dips, cheese dips, cultured buttermilk, yoghurt, and the like.

All components used to make the acidified products are standard for that use, except for the stabilizing gum composition, and are used in proportions conventionally used to prepare acidified milk products.

The milk material used may be whole milk, cream, partially skimmed milk, evaporated milk, concentrated milk containing between 18 to 20% total solids, mixtures thereof, reconstituted dry milk, the corresponding filled milk products, and the like.

Also, acidification is accomplished in the known manner as by the use of bacterial cultures to give the degree of acidity desired.

Minor components commonly used, such as flavoring compounds (vanilla, strawberry and prune flavorings) are used in their usual proportions.

The edible stabilizing gum is selected from the group consisting of edible vegetable gums, seaweed extracts, synthetic gums, and mixtures thereof. Sepcific examples are locust bean gum, guar gum, gum Karaya, starch, carrageenan, calcium alginate, ammonium alginate, propylene glycol alginate, and carboxymethyl-cellulose. While any of the stabilizers may be used alone, better viscosity control and absence of off-flavors (due to the stabilizers) are obtained by the use of a mixture of a vegetable gum, seaweed extract, and synthetic gum. For this reason, it is preferred to use a mixture and specifically a mixture of guar gum, carrageenan, and carboxymethylcellulose.

As to proportions, the milk material, bacterial culture, and minor components, as noted above, are used in the usual amounts. The stabilizing gum is used in amount sufficient to prevent any substantial decrease in viscosity of the acidified milk products due to sterilization thereof by heat. Ordinarily, the amount of gum to accomplish this result varies from about 0.25 part to about 2 parts by weight, for 100 parts of acidified product. The most effective amount varies dependent upon type of acidified product and stabilizing gum composition. Most suitable proportions are readily determined by making test runs.

When combinations of gums are to be used, the range of proportions of each component for 100 parts of the combination is as follows:

|                   | Parts by weight |
|-------------------|-----------------|
| Vegetable gum     | 30–50           |
| Seaweed extract   | 20–50           |
| Synthetic gum     | 20–35           |

The stabilizing gum is preferably dispersed in water and added to the milk material after the milk has been fermented to the final degree of acidity desired and prior to sterilization. The gum may be added after sterilization, but this requires a sterile gum and sterile processing conditions to obtain a commercially sterile end product.

It is important that the stabilizer be dispersed completely and substantially uniformly throughout the product. This can best be accomplished by heating the mixture of gum and acidified product to about 100°–150° F. and homogenizing at about 200–500 p.s.i.

Due to acidity of the products, somewhat lower sterilization temperatures can be used than those normally employed for unacidified milk products. The temperature-time relationship required to sterilize, ranges from about 200° F. for about 5 seconds for highly acid products such as yoghurt, to 270°–280° F. for 3 to about 12 seconds for the less acid products such as sour cream.

If sterilization follows addition of the stabilizer to the product it is preferred, though not essential, to homogenize the product at a pressure of about 300 to 4000 p.s.i. depending upon the viscosity or body desired in the finished product.

To preserve the sterility of the products indefinitely without refrigeration they are packaged aseptically in sanitary cans using conventional aseptic packing techniques.

The present invention will be further illustrated by the following specific examples of the practice of it. In these examples and elsewhere herein, proportions are expressed as parts by weight.

EXAMPLE 1

100 parts of 18% cream was prepared by mixing 60.7 parts of 3.6% whole milk and 39.3 parts of 39% cream. The cream was heated to 145° F. and homogenized in a double-stage homogenizer at 2500/500 p.s.i. The homogenized cream was pasteurized in a vat by heating to 160° F. and holding at that temperature for 15 minutes. The pasteurized cream was then cooled to 65° F. and approximately 300 ml. of latic bacterial starter was added and the mixture allowed to stand overnight.

The resulting fermentation soured the cream and when the titratable acidity reached 0.62%, as determined by the standard test for acidity, the sour cream was heated to 125° F. and then pumped through a tubular heat exchanger where it was sterilized by being heated to 280° F. for 3 seconds before cooling to approximately 140° F.

The sour cream was divided into several smaller batches, each of which had a different stabilizing gum composition added thereto as follows:

(1) 0.5% carboxymethylcellulose
(2) 1.0% carboxymethylcellulose
(3) 0.5% gum guar
(4) 0.5% gum guar plus 0.5% carboxymethylcellulose
(5) 0.5% carrageenan
(6) 0.5% guar gum, 0.25% carboxymethylcellulose, and 0.25% carrageenan.

In each case the product was then homogenized at either 500 p.s.i. single state or 1800/500 p.s.i. double staged and packaged. The product containing 0.5% guar gum, 0.25% carboxymethylcellulose and 0.25% carrageenan was best of all and did not thin out or whey off even after extended storage.

EXAMPLE 2

85 parts of 3.8% fat whole milk, 93 parts of 39% fat cream and 3.5 parts of non fat dry milk solids were mixed to yield 181.5 parts of cream testing 21.765% fat. When mixed with 38 pounds of water to incorporate the gums, the yield was 219.5 parts of finished cream testing 18% fat. To the 181.5 parts of cream were added 248 grams of carboxymethylcellulose (0.25% of finished product). The mixture was heated to 140° F., homogenized at 2000/500 p.s.i. and heated to 160–165° F., held for 15 minutes, cooled to 70° F. and a 1% lactic bacterial starter was added and the mixture allowed to stand overnight.

The resulting fermentation soured the cream and when the titratable acidity reached 0.82%, as determined by the standard test for acidity, a mixture of 38 parts of water and 0.5% locust bean gum with (5% of the locust bean gum weight) tetra sodium pyrophosphate and 0.2% Gelcarin HMR (carrageenan) were added. These gum percentages were based on final weight of the sour cream and water basis or 219.5 pounds and thoroughly mixed. The mixture was homogenized on a double stage homogenizer at 500/250 p.s.i., pumped through a Votator heater and heated to 275° F. to 280° F. with a 12 to 13 second hold and then cooled to 135° F. and homogenized on a single stage sterile homogenizer at 2500 p.s.i. The sterile cream was then canned in a Dole aseptic canner and the finished cans cooled in cold water.

The body and flavor of the product from this run was good after 30 days at 75° F. and 92° F. storage.

EXAMPLE 3

63 parts of raw whole milk was mixed with 5.75 parts of non-fat dried milk solids and heated to 160° F., homogenized in a double stage homogenizer at 2500/500 p.s.i. and heated again to 180° F. for 15 minutes. The mixture was cooled to 105° F. and a commercial yoghurt bacterial culture added at the rate of 1.25% of the milk and nonfat dried milk mixture. The mixture was set at 92° F. for four hours and then placed at 40° F. overnight.

The resulting fermentation soured the milk and nonfat dry milk solids mixture and when the titratable acidity reached 1.7% as determined by the standard test for acidity, the mixture was divided into three equal portions each of which had a different stabilizing gum composition (mixed with water) added thereto as follows:

| (A) | Percent |
|---|---|
| Locust bean gum | 0.5 |
| Carrageenan | 0.4 |
| Propylene glycol alginate | 0.4 |
| (B) | |
| Locust bean gum | 0.5 |
| Carrageenan | 0.4 |
| Propylene glycol alginate | 0.4 |
| Tetra sodium pyrophosphate | 0.2 |
| (C) | |
| Pregelatinized carob gum (a pregelatinized locust bean gum) | 0.4 |
| Carrageenan | 0.4 |
| Propylene glycol alginate | 0.4 |
| Locust bean gum | 0.1 |

These percentages were based on the total weight of the resulting product.

The yoghurt and gum mixtures were then pumped through a tubular heat exchanger where they were heated to 200° F. for 5 seconds before cooling to 160° F. The products were then homogenized in a double stage homogenizer at 2500/500 p.s.i., packaged and cooled.

The resulting products were stored at 40° F. for extended periods and did not thin out or whey off, with C judged to be the best as to viscosity and organoleptic properties.

It will be understood that it is intended to cover all changes and modifications of the examples of the invention herein chosen for the purpose of illustration which do not constitute departures from the spirit and scope of the invention.

What is claimed is:

1. In the method of preparing commercially sterile acidified milk products the steps of fermenting a milk material until the desired degree of acidity is attained and thoroughly admixing with said acidfied material an edible stabilizing gum selected from the group consisting of vegetable gums, seaweed extracts, synthetic gums and mixtures thereof, in amount sufficient to prevent substantial decrease in the viscosity of said acidified material due to sterilization thereof by heat, and sterilizating the resultant mixture.

2. The method of claim 1 in which the mixture of acidified milk material and gum is packaged and the amount of gum used is from about 0.25 part to about 2 parts by weight for 100 parts by weight of acidified milk material.

3. The method of claim 1 in which the acidified milk material and stabilizing gum are each sterilized prior to being admixed, said admixture being carried out under sterile conditions, and the amount of gum used is from about 0.25 part to about 2 parts by weight for 100 parts by weight of acidified milk material.

4. The method of claim 1 in which the edible stabilizing gum consists, for each 100 parts by weight of the gum, of a mixture of 30–50 parts guar gum, 20–50 parts of carrageenan, and 20–35 parts of carboxymethylcellulose.

(References on following page)

References Cited

UNITED STATES PATENTS

| | | | |
|---|---|---|---|
| 2,719,793 | 10/1955 | Page et al. | 99—59 |
| 3,054,684 | 9/1962 | Smith | 99—212 X |
| 3,359,116 | 12/1967 | Little | 99—54 |
| 3,235,387 | 2/1966 | Stumbo et al. | 99—59 |

OTHER REFERENCES

J. H. Litchfield: Use Stabilizer and Acid to Replace Bacteria in Making Sour Cream Buttermilk, Food Processing, May 1964, pp. 130–132).

LIONEL M. SHAPIRO, Primary Examiner

D. M. NAFF, Assistant Examiner

U.S. Cl. X.R.

99—59, 183